United States Patent [19]

Fernando et al.

[11] Patent Number: 5,124,202

[45] Date of Patent: Jun. 23, 1992

[54] PHYLLOSILICATE CONTAINING AMINOPLAST WEAR LAYER FOR RESILIENT SURFACE COVERINGS

[75] Inventors: Raymond H. Fernando; Walter J. Bohrn, both of Lancaster, Pa.

[73] Assignee: Armstrong World Industries, Inc., Lancaster, Pa.

[21] Appl. No.: 470,148

[22] Filed: Jan. 25, 1990

[51] Int. Cl.$^5$ .......................... B32B 5/16; B32B 27/00
[52] U.S. Cl. .................................. 428/324; 428/331; 428/413; 428/424.6; 428/502; 428/908.8
[58] Field of Search .................. 428/908.8, 413, 424.6, 428/324, 331, 502

[56] References Cited

U.S. PATENT DOCUMENTS

| | | | |
|---|---|---|---|
| 3,923,926 | 12/1975 | Harada et al. | 260/77.5 |
| 4,436,862 | 3/1984 | Tetenbaum et al. | 524/445 |
| 4,781,987 | 11/1988 | Bolgiano et al. | 428/424.6 |
| 4,935,286 | 6/1990 | Witman | 428/524 |
| 4,983,466 | 1/1991 | Witman | 428/908.8 |

Primary Examiner—P. C. Sluby

[57] ABSTRACT

The flexibility of aminoplast wear layers is improved by the addition of a phyllosilicate. The concentration of the phyllosilicate is sufficiently low to not adversely affect other physical properties of the wear layer. The reduction or elimination of urethane improves stain resistance. The gloss level obtained for a given concentration of phyllosilicate depends on the particle size, and therefore type of phyllosilicate, as well as amount of phyllosilicate. A surface covering having areas of different gloss level can be obtained by printing areas forming the wear layer with compositions containing different types of phyllosilicates.

12 Claims, No Drawings

5,124,202

PHYLLOSILICATE CONTAINING AMINOPLAST WEAR LAYER FOR RESILIENT SURFACE COVERINGS

FIELD OF THE INVENTION

The invention relates to a flexible and stain-resistant aminoplast wear layer for resilient surface coverings. More particularly, the invention is directed to an aminoplast wear layer including a phyllosilicate which is flexible enough to be bonded to a resilient support substrate and has improved stain resistance. The invention is also directed to a method of making a resilient surface covering including such a wear layer and controlling the gloss level of the wear layer.

BACKGROUND OF THE INVENTION

Resilient surface coverings, and in particular resilient floor coverings, are well known in the art. The floor coverings which are in wide use today are primarily of vinyl construction and, although they can be constructed to have varying degrees of flexibility, they are "resilient" when compared to conventional natural materials, such as ceramic tile. A variety of such products are commercially available and these products have proven to exhibit good wear resistance; however, such coverings are not without certain deficiencies. For example, although vinyl flooring products are durable and stain resistant, they nevertheless tend to lose their glossy appearance through wear. A high-gloss appearance for a floor covering is often desired. Accordingly, the manufacturers of such materials have long sought to find improved floor coverings which exhibit good gloss retention.

One method of providing improved gloss retention is through the application of polyurethane or other wear layers to vinyl flooring structures. Such materials are durable and relatively scratch resistant, and they tend to retain their high-gloss appearance over a longer period of time than do vinyl-surfaced flooring structures. Nevertheless, these wear layers, and in particular polyurethane wear layers, also have certain drawbacks. For example, they are more susceptible to staining; thus, when exposed to common household stains as ballpoint pen, lipstick, mustard, shoe polish and the like, polyurethane coatings tend to be more easily stained than vinyl coatings.

Another method has been to provide gloss retention and improved stain resistance by the use of different types of urea- or melamine-formaldehyde resins, often referred to as aminoplasts, as disclosed in Bolgiano et al. U.S. Pat. No. 4,781,987, which is incorporated herein by reference. While such wear layers have improved stain resistance, the improvement has come at the sacrifice of flexibility. To obtain a greater degree of flexibility, urethane is incorporated into the wear layer composition which again degrades the stain resistance.

Accordingly, one objective of the present invention is to provide an aminoplast wear layer for resilient surface coverings having increased flexibility and improved stain resistance.

Another object of the present invention is to permit the use of reduced levels of urethane in aminoplast wear layers for resilient surface coverings.

A further object of the present invention is to provide a method of controlling gloss level of an aminoplast wear layer without substantially affecting the other performance properties of the wear layer including stain resistance, adhesion, gloss retention and scuff resistance.

A still further object of the present invention is to provide a wear layer and method of making the wear layer having areas of different gloss level.

These and other advantages of the present invention will become apparent from the detailed description of the preferred embodiments which follow.

SUMMARY OF THE INVENTION

This invention relates to the production of a thin hard coating with a high degree of flexibility, gloss, optical clarity and excellent stain resistance when applied and cured as a wear-layer for resilient surface coverings. The coating is an aminoplast composition which may include other organic components, such as epoxy and urethane. Water-borne organic coatings comprised of epoxy, urethane and melamine can be formulated to achieve excellent stain resistance, but they have very poor flexibility. Their flexibility is remarkably improved when a phyllosilicate, or layered silicate, is incorporated at very low levels (ca. 1.0–2.0 wt. % based on dry weight of the coating). Such a small quantity of phyllosilicate does not substantially affect the other performance properties of the wear layer.

The size of the phyllosilicate particles does not appreciably affect the flexibility imparted to the aminoplast wear layer. However, the size of the phyllosilicate particles dramatically affects the gloss level of the wear layer. Therefore, the gloss level of the aminoplast wear layer can be controlled in a predetermined manner by appropriately selecting the type, therefore size, of the phyllosilicate.

DETAILED DESCRIPTION OF THE INVENTION

It has been found that the addition of phyllosilicates to the water-borne organic coating formulations of the Bolgiano et al. reference remarkably improves the flexibility of the wear-layer. This was evident from the results of the Mandrel Bend test which is a standard test for determining flexibility of coating films applied on a substrate. A greater degree of bending was required to induce cracks in films containing the layered silicate that those without. Also, such induced cracks were discontinuous when the coating contained the layered silicate. This effect appears to be due to the particular geometry (i.e., the layered structure) of the phyllosilicate particles. Spherical silica particles of comparable size to the layered silicate particles do not improve film flexibility.

The increased flexibility caused by the addition of layered silicates have been utilized to produce wear-layer coatings with improved performance. In a water-borne organic coating formulation of Bolgiano et al., urethane is the flexibilizing component. However, increasing the urethane content decreases the coating's stain resistance. Replacement of most, if not all, of the urethane by the layered silicate yields coating films with excellent stain resistance and high degree of flexibility.

Also, incorporation of the layered silicate improves processing of the coating. Totally organic coatings such as those described in Bolgiano et al. have to be formulated at high solids levels (e.g., 38 wt. %) to achieve the viscosities required for application by the roll coaters. High solids levels, however, are not desirable due to potential problems in the coating formulation's viscosity stability. Incorporation of the layered silicate enables achieving the required high viscosities at low solids levels.

A coating having satisfactory stain resistance and consisting of only the organic components must be applied at a dry film thickness of less than about 0.5 mil. Increasing the film thickness adversely affects the coating's flexibility. But, the organic/inorganic coating containing the layered silicate of the present invention can be applied at a higher film thickness while maintaining the required flexibility. This will ease constraints on wet film thickness applied during processing.

If the Bolgiano et al. compositions were formulated at low solids levels (i.e., less than about 30 wt. %), the coatings would not have high enough viscosities to meet most of the processing requirements. Increased viscosities may be achieved by formulating the compositions at a higher solids level (34 wt. %) and adding a rheology modifier such as 2,2,4-trimethyl-1,3-pentenediol monoisobutyrate. However, a small variation in solids content results in dramatic changes in viscosity which could very likely lead to problems during production. Further, the 2,2,4-trimethyl-1,3-pentenediol monoisobutyrate is a common coalescing aid which very likely leads to the limited storage stability of the Bolgiano et al. compounds having this rheology modifier when stored at an ambient temperature of about 100° F.

Incorporation at very low levels (less than about 1 wt. %) of phyllosilicate into the Bolgiano et al. compositions imparts high viscosity due to their unique plate-like structure. Therefore, the wt. % of the composition can be reduced to about 30 wt. % with the addition of phyllosilicates at a level low enough to not appreciably affect the other physical properties of the wear coating.

There are many phyllosilicates or layered silicates which occur naturally. Examples include hectorite, montmorrilonite and vermiculite. These natural layered silicates contain impurities, and generally have broad particle size distributions. Their addition can adversely affect the optical clarity and color of a wear-layer coating. Laponite, a very small particle size (nanometer size range), synthetic layered silicate that has a structure very similar to hectorite is also available. Laponite is more suitable for a resilient surface covering wear layer because of the purity and ability to form optically clear films.

EXAMPLE 1

Two coating formulations (Table I) containing a melamine, a urethane and an epoxy at a 30:10:60 ratio (based on weight) were prepared. Sample 1 contained only the organic components. A synthetic hectorite layered silicate was incorporated in Sample 2 at a 2.6 wt. % concentration. These coatings were applied on a resilient substrate using a draw-down blade and cured in a laboratory oven for 2 minutes at 200° C. Films from both formulations appeared to be clear and high in gloss. Films from formulation Sample 2 showed a greater degree of flexibility.

TABLE I

| Component | Formulation | |
|---|---|---|
| | Sample 1 | Sample 2 |
| Melamine (100%) | 11.4 | 8.4 |
| Urethane (30%) | 12.4 | 9.1 |
| Epoxy (55%) | 41.4 | 30.5 |
| Laponite RDS[1] (4%) | — | 18.4 |

TABLE I-continued

| Component | Formulation | |
|---|---|---|
| | Sample 1 | Sample 2 |
| Catalyst | 2.0 | 1.5 |
| Surfactant | 3.0 | 2.24 |
| Water | 29.8 | 29.8 |
| Total | 100.0 | 100.0 |
| Solids (wt. %) | 39.6 | 29.9 |

[1]Sold by Laporte Industries Ltd.

EXAMPLE 2

Three coating formulations (Table II) containing a melamine, a urethane and an epoxy at 20:20:60 ratio (based on weight) were prepared. Sample 3 contained only the organic components. The synthetic hectorite layered silicate was incorporated in Sample 4 at a 2.44 wt. % concentration. Spherical silica particles were incorporated in Sample 5 at a 2.44 wt. % concentration. These formulations were applied on a resilient substrate at two film thicknesses of approximately 0.6 mils and 0.9 mils using wire-wound-rods and cured similarly to Example 1. All films appeared clear and high in gloss; all had excellent stain resistance. As shown in Table III, flexibility of the films with layered silicate was much better than those without the layered silicate. As expected, the thinner phyllosilicate containing film was more flexible than the thicker phyllosilicate containing film.

TABLE II

| Component | Formulation | | |
|---|---|---|---|
| | Sample 3 | Sample 4 | Sample 5 |
| Melamine (100%) | 12.00 | 12.00 | 12.00 |
| Urethane (30%) | 40.00 | 40.00 | 40.00 |
| Epoxy (55%) | 65.45 | 65.45 | 65.45 |
| Laponite RDS (4%) | — | 37.50 | — |
| Spherical Silica (4%) | — | — | 37.50 |
| Catalyst | 3.52 | 3.52 | 3.52 |
| Surfactant | 5.28 | 5.28 | 5.28 |
| Water | 73.77 | 41.26 | 41.26 |
| Total | 200.02 | 205.01 | 205.01 |
| Solids (wt. %) | 30 | 30 | 30 |

TABLE III

| | Mandrel Bend Flexibility Data | | | | | | | |
|---|---|---|---|---|---|---|---|---|
| Formula ID | Layered Silicate Content (wt. %) | Spherical Silica Content (wt. %) | Film Thickness (mils) | Mandrel Rod Diameter (in.) | | | | |
| | | | | ⅛ | ¼ | ⅜ | ½ |
| Sample 3 | — | — | 0.58 | F | F | F | F |
| Sample 4 | 2.44 | — | 0.70 | P | P | F | F |
| Sample 5 | — | 2.44 | 0.65 | F | F | F | F |
| Sample 3 | — | — | 0.88 | F | F | F | F |
| Sample 4 | 2.44 | — | 0.97 | P | F | F | F |
| Sample 5 | — | 2.44 | 0.83 | F | F | F | F |

P—Pass (i.e., no visible cracks); F—Fail

EXAMPLE 3

Three formulations (Table IV) similar to those described in Example 2 above were prepared containing a melamine, a urethane and an epoxy at a ratio of 20:30:50. Coating films were prepared in a manner similar to that described above. All films appeared clear and high in gloss; all had the same level of stain resistance. Flexibility of the film with the layered silicate was much better than those without (Table V).

TABLE IV

| Component | Formulation | | |
|---|---|---|---|
| | Sample 6 | Sample 7 | Sample 8 |
| Melamine (100%) | 12.00 | 12.00 | 12.00 |
| Urethane (30%) | 60.00 | 60.00 | 60.00 |
| Epoxy (55%) | 54.52 | 54.52 | 54.52 |
| Laponite RDS (4%) | — | 37.50 | — |
| Spherical Silica (4%) | — | — | 37.50 |
| Catalyst | 3.52 | 3.52 | 3.52 |
| Surfactant | 5.28 | 5.28 | 5.28 |
| Water | 64.70 | 33.58 | 33.58 |
| Total | 200.02 | 206.40 | 206.40 |
| Solids (wt. %) | 30 | 30 | 30 |

TABLE V

| Formula ID | Mandrel Bend Flexibility Data | | | | | | |
|---|---|---|---|---|---|---|---|
| | Layered Silicate Content (wt. %) | Spherical Silica Content (wt. %) | Film Thickness (mils) | Mandrel Rod Diameter (in.) | | | |
| | | | | ⅛ | ¼ | ½ | ¾ |
| Sample 6 | — | — | 0.62 | P | P | F | F |
| Sample 7 | 2.44 | — | 0.72 | P | P | P | P |
| Sample 8 | — | 2.44 | 0.74 | P | P | F | F |
| Sample 6 | — | — | 0.98 | F | F | F | F |
| Sample 7 | 2.44 | — | 1.00 | P | P | P | F |
| Sample 8 | — | 2.44 | 0.99 | F | F | F | F |

P—Pass (i.e., no visible cracks). F—Fail

EXAMPLE 4

Three coating formulations (Table VI) containing a melamine, a urethane and an epoxy at a 20:20:60 ratio (based on weight) were prepared. Sample 9 contained only the organic components. The synthetic hectorite layered silicate was incorporated in Samples 10 and 11 at 2.44 and 4.76 wt. % concentrations. These formulations were applied on a resilient substrate at two film thicknesses using wire-wound-rods and cured similarly to Example 1. All films appeared clear and high in gloss; all had excellent stain resistance. Flexibility of the films with the layered silicate at both levels was much better than those without (Table VII).

TABLE VI

| Component | Formulation | | |
|---|---|---|---|
| | Sample 9 | Sample 10 | Sample 11 |
| Melamine (100%) | 12.00 | 12.00 | 12.00 |
| Urethane (30%) | 40.00 | 40.00 | 40.00 |
| Epoxy (55%) | 65.45 | 65.45 | 65.45 |
| Laponite RDS (8%) | — | 18.75 | 37.50 |
| Catalyst | 3.52 | 3.52 | 3.52 |
| Surfactant | 5.28 | 5.28 | 5.28 |
| Water | 73.77 | 60.01 | 46.25 |
| Total | 200.02 | 205.01 | 210.00 |
| Solids (wt. %) | 30 | 30 | 30 |

TABLE VII

| Formula ID | Mandrel Bend Flexibility Data | | | | | |
|---|---|---|---|---|---|---|
| | Layered Silicate Content (wt. %) | Film Thickness (mils) | Mandrel Rod Diameters (in.) | | | |
| | | | ⅛ | ¼ | ½ | ¾ |
| Sample 9 | — | 0.48 | P | P | F | F |
| Sample 10 | 2.44 | 0.54 | P | P | P | P |
| Sample 11 | 4.76 | 0.43 | P | P | P | P |
| Sample 9 | — | 0.76 | F | F | F | F |
| Sample 10 | 2.44 | 0.80 | P | P | P | F |
| Sample 11 | 4.76 | 0.76 | P | P | P | P |

P—Pass (i.e., no visible cracks). F—Fail

Neither the phyllosilicate nor the spherical silica of Examples 2 and 3 above significantly affected the stain resistance of the films to household staining agents when compared to the formulations containing only organic components. However, the films of Example 2 containing lower urethane content showed better stain resistance than those of Example 3.

It has been found that not only the level of phyllosilicate in the wear layer composition affects the gloss level of the wear layer but also the type of phyllosilicate affects the gloss level with little or no effect on other performance properties of the coating film such as stain resistance, adhesion, gloss retention and scuff resistance. About twice as much conventional flatting agents are required to achieve the same effect on gloss. Also, such conventional flatting agents have greater adverse effects on the other performance properties of the coating film.

EXAMPLE 5

Three coating formulations (Table VIII) containing a melamine, a urethane and an epoxy at a 20:20:60 ratio (based on weight) were prepared. Sample 12 contained only the organic components. The layered silicate (Laponite RDS) used in previous examples was incorporated in Sample 13 at a 2.44 wt. % concentration. A slightly larger particle size layered silicate of the same composition (Laponite S) was incorporated in Sample 14 at a 2.44 wt. % concentration. These formulations were applied on a resilient substrate at two film thicknesses using wire-wound-rods, and cured similarly to Example 1. All films appeared clear and had excellent stain resistance. Films containing the Laponite S appeared significantly lower in gloss. Flexibility of the films with both layered silicates is much better than those without (Table IX).

TABLE VIII

| Component | Formulation | | |
|---|---|---|---|
| | Sample 12 | Sample 13 | Sample 14 |
| Melamine (100%) | 12.00 | 12.00 | 12.00 |
| Urethane (30%) | 40.00 | 40.00 | 40.00 |
| Epoxy (55%) | 65.45 | 65.45 | 65.45 |
| Laponite RDS (4%) | — | 37.50 | — |
| Laponite S[1] (4%) | — | — | 37.50 |
| Catalyst | 3.52 | 3.52 | 3.52 |
| Surfactant | 5.28 | 5.28 | 5.28 |
| Water | 73.77 | 41.26 | 41.26 |
| Total | 200.02 | 205.01 | 205.01 |
| Solids (wt. %) | 30 | 30 | 30 |
| Wt. % Silicate | 0 | 2.44 | 2.44 |
| Particle size | — | 74 nm | 124 nm |
| Gloss (@ 60°) | 98 | 94 | 54 |

[1]Sold by Laporte Industries Ltd.

TABLE IX

| Formula ID | Mandrel Bend Flexibility Data | | | | | | |
|---|---|---|---|---|---|---|---|
| | Layered Silicate 1 Content (wt. %) | Layered Silicate 2 Content (wt. %) | Film Thickness (mils) | Mandrel Rod Diameter (in.) | | | |
| | | | | ⅛ | ¼ | ½ | ¾ |
| Sample 12 | — | — | 0.46 | P | P | F | F |
| Sample 13 | 2.44 | — | 0.54 | P | P | P | F |
| Sample 14 | — | 2.44 | 0.49 | P | P | P | F |
| Sample 12 | — | — | 0.72 | F | F | F | F |
| Sample 13 | 2.44 | — | 0.70 | P | P | P | F |
| Sample 14 | — | 2.44 | 0.69 | P | P | P | F |

P—Pass (i.e., no visible cracks; F—Fail

EXAMPLE 6

Another set of coating formulations were prepared in the same manner as described above. The compositions of these formulations are provided in Table X below.

TABLE X

| Component | Sample 15 | Sample 16 | Sample 17 | Sample 18 |
|---|---|---|---|---|
| Melamine (100%) | 12.00 | 12.00 | 12.00 | 12.00 |
| Urethane (30%) | 40.00 | 40.00 | 40.00 | 40.00 |
| Epoxy (55%) | 65.45 | 65.45 | 65.45 | 65.45 |
| Laponite S (4%) | — | 25.00 | 25.00 | 25.00 |
| Natural Hectorite[1] | — | — | 5.00 | 25.00 |
| Catalyst | 3.52 | 3.52 | 3.52 | 3.52 |
| Surfactant | 5.28 | 5.28 | 5.28 | 5.28 |
| Water | 73.77 | 52.10 | 42.78 | 5.44 |
| Total | 200.02 | 203.34 | 204.00 | 206.66 |
| Solids (wt. %) | 30 | 30 | 30 | 30 |
| Melamine:Urethane:Epoxy | | 20:20:60 | | |
| Wt. % Silicate | 0 | 1.63 | 1.96 | 3.20 |
| Gloss (@ 60°) | 100 | 77 | 66 | 34 |

[1]Hectorite AW sold by American Colloid Company

EXAMPLE 7

An additional set of coating formulations were prepared in the same manner as described above. The compositions of these formulations are provided in Table XI below. All films had good stain and scuff resistance.

TABLE XI

| Component | Sample 19 | Sample 20 | Sample 21 | Sample 22 | Sample 23 |
|---|---|---|---|---|---|
| Melamine (100%) | 12.00 | 12.00 | 12.00 | 12.00 | 12.00 |
| Urethane (30%) | 40.00 | 40.00 | 40.00 | 40.00 | 40.00 |
| Epoxy (55%) | 65.45 | 65.45 | 65.45 | 65.45 | 65.45 |
| Laponite S (6%) | — | 20.40 | — | — | — |
| Polargel HV[1] (6%) | — | — | 20.40 | — | — |
| Hectobrite AW (4%) | — | — | — | 30.60 | — |
| Magnobrite T[2] (4%) | — | — | — | — | 30.60 |
| Catalyst | 3.52 | 3.52 | 3.52 | 3.52 | 3.52 |
| Surfactant | 5.28 | 5.28 | 5.28 | 5.28 | 5.28 |
| Water | 73.77 | 57.42 | 57.42 | 47.22 | 47.22 |
| Total | 200.0 | 204.1 | 204.1 | 204.1 | 204.1 |
| Solids (wt. %) | 30 | 30 | 30 | 30 | 30 |
| Melamine:Urethane:Epoxy | | | 20:20:60 | | |
| Wt. % Silicate | 0 | 2.0 | 2.0 | 2.0 | 2.0 |
| Gloss (@ 60°) | 98 | 64 | 77 | 66 | 49 |
| Mandrel Bend | F | P(¼") | P(¼") | P(¼") | P(¼") |

[1]A montmorillonite clay sold by American Colloid Company
[2]A blend of smectite clays sold by American Colloid Company As is readily apparent from Table XI, the gloss level of the coating is dependent upon the type of phyllosilicate used. The level of gloss can also be controlled by the amount of phyllosilicate and by blending the various phyllosilicates.

A wear layer having different layers of gloss can be made by printing various wear layer compositions having different phyllosilicates onto a resilient support surface by methods known in the art and then curing the wear layer. By this means, different areas of the wear layer will have different levels of gloss.

What is claimed is:

1. A resilient surface covering comprising a resilient support substrate and a flexible wear layer bonded to said support substrate, said wear layer comprising a composition comprising an aminoplast and a phyllosilicate.

2. The covering of claim 1 wherein the wear layer composition comprises an epoxy, an aminoplast and a phyllosilicate.

3. The covering of claim 1 wherein the wear layer composition comprises a urethane, an aminoplast and a phyllosilicate.

4. The covering of claim 3 wherein the wear layer composition comprises an epoxy, a urethane, an aminoplast and a phyllosilicate.

5. The covering of claim 1 wherein the wear layer composition comprises a polyol, an aminoplast and a phyllosilicate.

6. The covering of claim 1 wherein the phyllosilicate is selected from the group consisting of kaolin minerals, vermiculite minerals, mica minerals and smectite minerals.

7. The covering of claim 6 wherein the smectite mineral is selected from the group consisting of montmorillonite, bentonite, beidellite, nontronite, saponite, natural hectorite and synthetic hectorite.

8. The covering of claim 1 wherein the wear layer has a first area having a first gloss level and a second area having a second gloss level, the gloss level of the first area being different than the gloss level of the second area, the first area of the wear layer comprising a first type of phyllosilicate and the second area of the wear layer comprising a second type of phyllosilicate, the first type of phyllosilicate being different than the second type of phyllosilicate.

9. A method of making a resilient surface covering comprising the steps of providing a resilient support substrate, forming a wear layer composition comprising an aminoplast and a phyllosilicate, forming a wear layer with the wear layer composition and bonding the wear layer to the resilient support substrate.

10. The method of claim 9 wherein a urethane is added to the wear layer composition.

11. A method of controlling gloss level of a wear layer of a resilient surface covering comprising the steps of (1) selecting a phyllosilicate of predetermined size, (2) forming a wear layer composition an aminoplast and the phyllosilicate, and (3) forming the wear layer with the layer composition.

12. The method of claim 11 wherein a first area of the wear layer is formed by selecting a first type of phyllosilicate, forming a first wear layer composition comprising an aminoplast and the first type of phyllosilicate, and forming the first area with the first wear layer composition; and a second area of the wear layer is formed by selecting a second type of phyllosilicate, forming a second wear layer composition comprising an aminoplast and the second type of phyllosilicate, and forming the second area with the second wear layer composition, the second type of phyllosilicate being different than the first type of phyllosilicate.

* * * * *